United States Patent
Groben et al.

(10) Patent No.: US 11,590,826 B2
(45) Date of Patent: Feb. 28, 2023

(54) AIR VENT FOR A VEHICLE

(71) Applicant: ILLINOIS TOOL WORKS INC., Glenview, IL (US)

(72) Inventors: Manfred Groben, Gau-Bickelheim (DE); Günther Krämer, Enkenbach-Alsenborn (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 155 days.

(21) Appl. No.: 17/293,363

(22) PCT Filed: Nov. 12, 2019

(86) PCT No.: PCT/US2019/060857
§ 371 (c)(1),
(2) Date: May 12, 2021

(87) PCT Pub. No.: WO2020/106490
PCT Pub. Date: May 28, 2020

(65) Prior Publication Data
US 2022/0009317 A1    Jan. 13, 2022

(30) Foreign Application Priority Data
Nov. 20, 2018  (DE) .................... 10 2018 129 188.4

(51) Int. Cl.
  *B60H 1/34*    (2006.01)
(52) U.S. Cl.
  CPC ... *B60H 1/3442* (2013.01); *B60H 2001/3471* (2013.01)
(58) Field of Classification Search
  CPC .......... B60H 1/3442; B60H 2001/3471; B60H 1/34; B60H 1/3414; B60H 1/3435; F24F 13/14; F24F 13/065
  See application file for complete search history.

(56) References Cited

U.S. PATENT DOCUMENTS

| 2004/0171342 A1 | 9/2004 | Kodaveridan |
| 2014/0342657 A1 | 11/2014 | Rais |
| 2021/0031594 A1* | 2/2021 | Schaal .................. B60H 1/345 |

FOREIGN PATENT DOCUMENTS

| DE | 10121909 A1 | 11/2002 |
| DE | 102005015222 B3 | 7/2006 |

(Continued)

OTHER PUBLICATIONS

PCT, International Search Report and Written Opinion, International Application No. PCT/US2019/060857; dated Feb. 19, 2020, 12 pages.

*Primary Examiner* — Jessica Yuen
(74) *Attorney, Agent, or Firm* — Thompson Hine LLP

(57) ABSTRACT

An air vent for a vehicle includes a housing (10) and an air-guiding element (30), wherein the air-guiding element (30) is mounted in the housing (10) so as to be pivotable in different directions about at least one centre of rotation (D), wherein a first drive element acts on the air-guiding element (30) at a first engagement point ($A_1$), and a second drive element acts on the air-guiding element (30) at a second engagement point ($A_2$), wherein the second engagement point ($A_2$) defines, with the at least one centre of rotation (D) of the air-guiding element (30), a first pivot axis (S1) about which the first drive element pivots the air-guiding element (30), and wherein the first engagement point ($A_1$) defines, with the at least one centre of rotation (D) of the air-guiding element (30), a second pivot axis ($S_2$) about which the second drive element pivots the air-guiding element (30).

15 Claims, 14 Drawing Sheets

(56) References Cited

FOREIGN PATENT DOCUMENTS

| | | | |
|---|---|---|---|
| DE | 102019210048 A1 * | 1/2021 | ........... B60H 1/3414 |
| DE | 102019120807 A1 * | 2/2021 | |
| EP | 2799340 A2 | 11/2014 | |

* cited by examiner

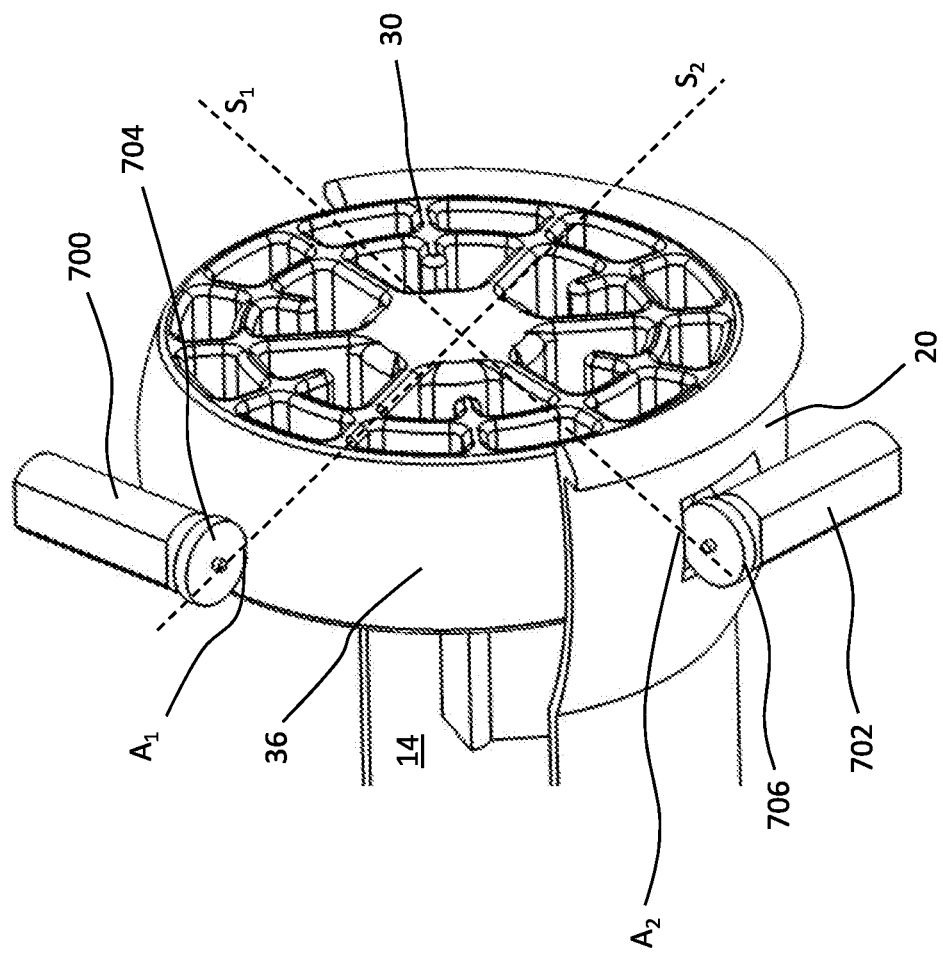

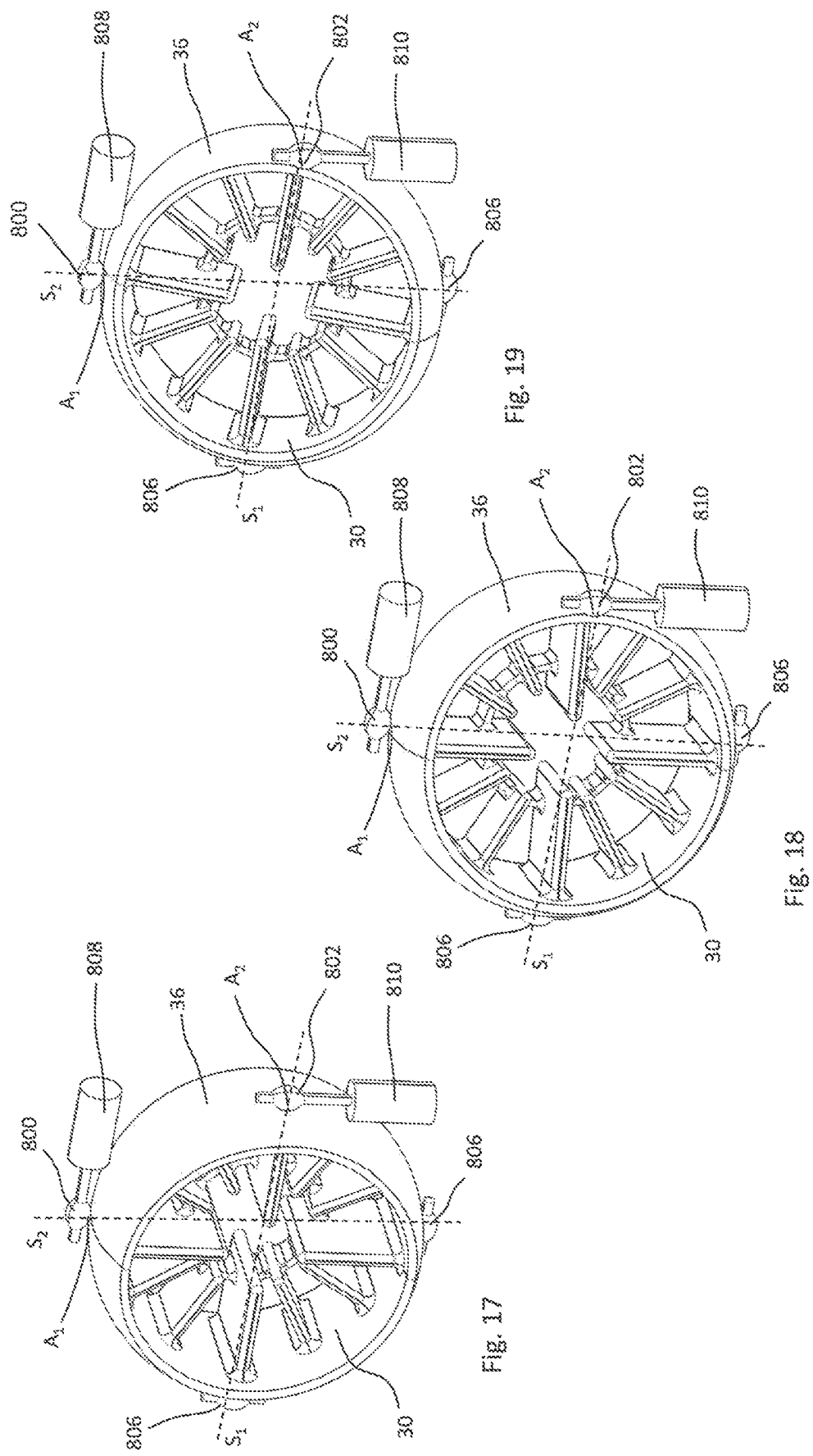

AIR VENT FOR A VEHICLE

TECHNICAL FIELD

The invention concerns an air vent for a vehicle, comprising a housing and an air-guiding element, wherein the air-guiding element is mounted in the housing so as to be pivotable in different directions about at least one center of rotation.

BACKGROUND

Air vents of the above-mentioned type serve to supply air to a vehicle interior, for example the interior of a car or truck. The air-guiding element can deflect an air stream flowing through the air vent from a main flow direction into any directions in a plane which is arranged in particular perpendicularly to the main flow direction. Such air vents are usually round air vents, also known as ball vents, with an air-guiding element which is substantially circular in cross-section and is mounted in a housing receptacle which is substantially in the form of a spherical shell. Known air vents of this type are normally adjusted manually by an operator by manual action on the air-guiding element. When such an air vent is fitted in a vehicle, an operator present in the vehicle interior may deflect the air flow reaching the interior from the air vent into any direction, for example upward or downward or to the sides, and in any intermediate positions, for example to the top right or bottom left.

An electric adjustment facility for air-guiding elements of air vents is known for air vents with air-guiding slats. Such air vents normally have two slat packs, each with several air-guiding slats arranged parallel to each other, wherein the slat packs are arranged successively in a main flow direction in an air channel delimited by the housing, and the air-guiding slats of the one slat pack are arranged substantially perpendicularly to the air-guiding slats of the other slat pack. These slat packs are responsible for deflecting the air flow in different axes. When such an air vent is fitted in the vehicle, usually one slat pack serves to deflect the air flow upward and downward from the main flow direction, and the other slat pack serves to deflect the air flow to the sides. DE 10 2005 015 222 B3 describes an air vent with a base body with horizontal and vertical slats which can be pivoted about a pivot axis between an open position and a closed position. DE 101 21 909 A1 in principle concerns the electrical control of air vents.

SUMMARY

Starting from the prior art outlined above, the invention is based on the object of providing an air vent in which the air-guiding element, which can be pivoted in any directions, can be controlled electrically.

The invention achieves this object with an air vent according to claim 1. Advantageous embodiments are the subject of the dependent claims, the description and the figures.

According to the invention, the air vent of the type cited above is characterized by a first drive element which acts on the air-guiding element at a first engagement point, and by a second drive element which acts on the air-guiding element at a second engagement point, wherein the second engagement point together with the center of rotation of the air-guiding element defines a first pivot axis about which the first drive element pivots the air-guiding element, and wherein the first engagement point together with the center of rotation of the air-guiding element defines a second pivot axis about which the second drive element pivots the air-guiding element.

As already stated, the air vent serves for targeted supply of an air stream to a vehicle interior. In particular, precisely one air-guiding element may be provided. The housing may have an inlet opening and an outlet opening, and an air channel for delimiting the air flowing from the inlet opening to the outlet opening in a main flow direction. The air-guiding element may in particular be arranged inside the air channel in the region of the outlet opening. Also, at least portions of the air-guiding element may form a part of the air-guiding channel and comprise the outlet opening. The air-guiding element can be pivoted in different directions, in particular in arbitrary directions about the center of rotation. The air-guiding element serves to deflect the air flow, as stated initially. An air stream flowing through the air channel in a main flow direction may be deflected by the air-guiding element and have a direction component in an arbitrary direction perpendicularly to the main flow direction. Thus when the air-guiding element is fitted in the vehicle, as stated above, it can deflect the air stream upward or downward, to the sides or in any intermediate positions.

As stated initially, the air vent may in particular be a round or spherical air vent. In principle, other shapes are also conceivable. The housing of the air vent may for example have a spherical portion inside which the air-guiding element is mounted. The air-guiding element may here be configured so as to be cylindrical, wherein the casing surface of the air-guiding element may have a curvature pointing radially outward and corresponding to a curvature of the inner face of the spherical portion of the housing. The air-guiding element may accordingly be a disc-shaped ball segment. Thus the air-guiding element can be pivoted about the center of rotation arbitrarily inside the housing. The air-guiding element is mounted in the manner of a ball joint in the housing and can be tilted about a ball joint which may be provided. The air-guiding element may in particular have passage openings spaced apart from each other by air-guiding ribs, for guiding and deflecting the air stream. The ribs and passage openings may in particular extend along a longitudinal axis of the air-guiding element, wherein in particular in the case of a cylindrical air-guiding element, the longitudinal axis may extend along the cylinder axis. In a neutral position of the air-guiding element, the longitudinal axis may in particular run parallel to the main flow direction through the center of rotation, wherein in the neutral position, as far as possible the air flow is not deflected from the main flow direction. If the air-guiding element is pivoted about the center of rotation, the longitudinal axis is oriented at an angle relative to the main flow direction, and the correspondingly oriented air-guiding ribs or passage openings deflect the air stream from the main flow direction in the direction of the tilted longitudinal axis.

In known air vents, such an air-guiding element can be manually tilted in any direction by an operator and the air flow deflected in the corresponding direction. The air vent according to the invention however allows electrical operation for performing such movements of the air-guiding element. For this, according to the invention, two intersecting pivot axes are defined which stand at an angle relative to each other. Thus according to the invention, a first drive element and a second drive element are provided, wherein the air-guiding element can be pivoted about the first pivot axis by means of the first drive element and about the second pivot axis by means of the second drive element. According to the invention, the first pivot axis is defined by the center of rotation of the air-guiding element and by the second engagement point of the second drive element on the air-guiding element, while the second pivot axis is defined by the center of rotation of the air-guiding element and the first engagement point of the first drive element on the air-guiding element. Therefore, the two pivot axes standing at an angle relative to each other are first formed by the connection of the drive elements to the air-guiding element according to the invention, and thus allow in particular electrical actuation of the air-guiding element. For this, an electric drive may be used, for example an electric motor acting on the drive elements, as will be explained below. The pivot axes may enclose between them in particular an angle of between 80° and 100°, preferably 90°. The center of rotation of the air-guiding element and the two engagement points consequently form a theoretical triangle. The engagement points may be arranged at the same distance or at different distances from the center of rotation. The pivot axes are not identical and in particular may stand substantially perpendicularly to the longitudinal axis of the air-guiding element. In order to deflect the air flow, the air-guiding element may be pivoted about the first pivot axis or about the second pivot axis, or about both pivot axes simultaneously. When the air-guiding element is pivoted about the first pivot axis, the second pivot axis is tilted about the center of rotation. Correspondingly, when the air-guiding element is pivoted about the second pivot axis, the first pivot axis is tilted about the center of rotation. Thus a pivot plane spanned by the pivot axes is also pivoted accordingly. If the air-guiding element is pivoted about both pivot axes, also both pivot axes are tilted about the center of rotation. By the connection of the drive elements to the air-guiding element according to the invention, in a simple fashion an electric adjustability of the air-guiding elements in any directions about the center of rotation can be achieved. For this, only two engagement points are necessary, i.e. in particular only two drive elements each with an electric motor. The first drive element may in particular act on the air-guiding element in at least a first engagement point. The second drive element may also act on the air-guiding element in at least a second engagement point. The at least one second engagement point together with the center of rotation of the air-guiding element may define the first pivot axis, and the at least one first engagement point together with the center of rotation of the air-guiding element may define the second pivot axis. For example, several first engagement points may be provided which, together with the center of rotation, define the second pivot axis. Also, several second engagement points may be provided which, together with the center of rotation, define the first pivot axis.

According to one embodiment, a ball joint-like mounting is formed at the first engagement point and/or a ball joint-like mounting is formed at the second engagement point. The first drive element and/or the second drive element may here be connected to the air-guiding element via a respective ball joint. Also, the first drive element and/or the second drive element may each engage in the manner of a hook in an opening of the air-guiding element. In this way too, a ball joint-like mounting may be achieved. Such a mounting allows further freedom of movement.

According to one embodiment, the two pivot axes span a pivot plane perpendicularly to a longitudinal axis of the air-guiding element running through the center of rotation. The two pivot axes intersect at the center of rotation of the air-guiding element and in particular stand substantially perpendicularly to each other. In this embodiment, the pivot plane and hence the two pivot axes stand in particular perpendicularly to a longitudinal axis of the air-guiding element which runs through the center of rotation. In a neutral position of the air-guiding element, the longitudinal axis of the air-guiding element may in particular stand parallel to a main flow direction of the air stream flowing through the air vent. In the case of a cylindrical air-guiding element, the longitudinal axis may in particular be the cylinder axis, as already mentioned. On pivoting of the air-guiding element, the longitudinal axis of the air-guiding element also moves. In this embodiment, the engagement points may be arranged in particular at the same length position along the longitudinal axis on the air-guiding element. For example, the engagement points may be arranged on air-guiding ribs extending in particular along the longitudinal axis. With such a symmetrical structure of the air vent, it is particularly easy to control the air-guiding element via the drive elements. In particular, the drive elements may be formed identically. In one embodiment, the air-guiding element is rotatable, in particular through a restricted angular range, about a longitudinal axis of the air-guiding element running through the center of rotation. The longitudinal axis of the air-guiding element mentioned several times may in particular be an axis of symmetry of the air-guiding element, and in the case for example of a cylindrical air-guiding element, may extend along the cylinder axis, and in particular in a neutral position of the air-guiding element, may run parallel to a main flow direction. With the pivoting of the air-guiding element provided according to the invention in any directions about the center of rotation, the longitudinal axis of the air-guiding element is tilted about the center of rotation, as already stated. In the embodiment described here, the air-guiding element may however also be configured so as to be rotatable about the longitudinal axis. Here, the pivot axes may also be rotated accordingly about the longitudinal axis. With such rotatability, using mechanisms known in themselves, a blocking flap for closing the air channel, arranged upstream in the air channel, may be adjusted between an open position and a closed position. The rotary movement of the air-guiding element about its longitudinal axis may here however be restricted by the drive elements. In particular, the rotary movement of the air-guiding element about its longitudinal axis may be restricted to an angular range between 30° and 60°, in particular to an angle of 45°.

In an alternative embodiment, a rotation of the air-guiding element about a longitudinal axis of the air-guiding element running through the center of rotation is blocked. The rotatability of the air-guiding element about its rotation axis, as explained above, may thus be prevented.

According to one embodiment, the air-guiding element is mounted on the housing by means of a ball joint. The movement of the air-guiding element in arbitrary directions about the center of rotation may thus be guaranteed by the ball joint. The ball joint sits on the center of rotation and hence in particular on the longitudinal axis of the air-guiding element. The ball joint may here have a mounting ball, in particular connected to the housing, and a mounting receptacle which is arranged in particular centrally on the longitudinal axis of the air-guiding element and is configured correspondingly to the mounting ball in order to receive the mounting ball.

According to one embodiment, the air-guiding element is mounted on the housing by means of a cardan joint. The cardan joint allows pivoting about the pivot axes, in particular standing perpendicularly to each other, but prevents the rotation of the air-guiding element about its longitudinal axis, or at least restricts this rotation to a limited angle, for example 45° in both rotation directions. Such a universal mounting may also be achieved via a ball joint, insofar as this is restricted in its rotation, for example by mutually corresponding guide means arranged on an outside of the mounting ball and on an inside of the mounting receptacle.

According to one embodiment, the air-guiding element is mounted on the housing by guide means arranged on an outer circumference of the air-guiding element and on an inner side of the housing. In particular, the air-guiding element may be mounted in this way inside the air channel. Alternatively or in addition to mounting on the center of rotation via the ball joint sitting on the center of rotation, or via the cardan joint sitting on the center of rotation, mounting may also take place via the outer periphery of the air-guiding element. For example, as already stated, the air-guiding element may be formed so as to be cylindrical, wherein the casing surface of the air-guiding element may have an outward curvature; the air-guiding element may thus be configured as a disc-like ball segment. The curved casing surface of the air-guiding element may then cooperate with a correspondingly curved inner face of the housing. The casing surface of the air-guiding element and the inner face of the housing thus form the guide means. Also, differently configured guide means may be arranged on the outer circumference of the air-guiding element and on the inside of the housing. The guide means may also form a cardan joint. A universal mounting may accordingly also be achieved on the outer periphery of the air-guiding element, in particular as an alternative to the universal mounting on the center of rotation. The cardan joint may comprise a mounting ring surrounding the air-guiding element, inside which the air-guiding element can be pivoted about one of the pivot axes of the cardan suspension. The mounting ring together with the air-guiding element may be pivotable inside the housing about the second of the pivot axes of the cardan suspension.

According to one embodiment, the first drive element has a first drive and a first engagement element connected to the first drive, wherein the first engagement element acts on the air-guiding element at the first engagement point, and/or the second drive element has a second drive and a second engagement element connected to the second drive, wherein the second engagement element acts on the air-guiding element at the second engagement point. The drives may in particular be electric drives, for example electric motors. Thus the air-guiding element may be controlled in the manner of an actuator. The drives may in particular be arranged inside or outside the air channel, wherein the engagement elements may protrude into the air channel when the drive is arranged outside the air channel. By arranging a drive outside the air channel, this does not obstruct the air flow. To guarantee a connection of the drive element to the air-guiding element, the housing may however have a passage opening through which the engagement element of the drive element transmits a movement provoked by the drive to the air-guiding element. The engagement elements may in particular have coupling rods acting on the air-guiding element at the respective engagement point. According to such an embodiment, the first engagement element has a first coupling rod which acts on the air-guiding element at the first engagement point, and/or the second engagement element has a second coupling rod which acts on the air-guiding element at the second engagement point. Also, the first engagement element may have a lever arm acting on the first coupling rod, or the second engagement element may have a second lever arm acting on the second coupling rod. The respective lever arm may in particular sit on a shaft of the drive and be pivoted about the shaft axis of the shaft via the drive. By pivoting the lever arm, the coupling rod may in particular be moved forward and back and thus pivot the air-guiding element about the respective pivot axis. The first coupling rod may for this be connected to the air-guiding element at the first engagement point, while the second coupling rod may be connected to the air-guiding element at the second engagement point. On pivoting of the first lever arm, the first coupling rod is then moved forward or back and hence the air-guiding element is pivoted about the first pivot axis, which according to the invention runs through the second engagement point at which the second coupling rod may be connected to the air-guiding element. Accordingly, a movement of the second lever arm leads to a movement of the second coupling rod and hence to a pivoting of the air-guiding element about the second pivot axis, which according to the invention runs through the first engagement point. With engagement elements configured in this way, the air-guiding element may be pivoted via a simple lever mechanism.

According to one embodiment, the first electric drive has a stroke-generating motor, in particular a linear or stroke-generating spindle motor, and/or the second drive has a stroke-generating motor, in particular a linear or stroke-generating spindle motor. In this way, the above-mentioned forward and back movement of the air-guiding element may be achieved by action of the respective engagement element on the respective engagement point. In particular, said coupling rods may be moved via such motors even without provision of a lever arm. Also, in particular in this embodiment, linearly actuated lift pegs may be provided as engagement elements.

In one embodiment, the first engagement element has a first threaded rod which acts on the air-guiding element at the first engagement point and which interacts with a first thread movably mounted on the air-guiding element at the first engagement point, and/or the second engagement element has a second threaded rod which acts on the air-guiding element at the second engagement point and which interacts with a second thread movably mounted on the air-guiding element at the second engagement point. Via such threaded rods, in particular a linear forward and back movement of the respective engagement points and hence a pivoting of the air-guiding element may be achieved. Said stroke-generating motor may also be used for this.

According to one embodiment, the first engagement element has a flexible first force-transmitting element which acts under tension, in particular a first cable pull, wherein the first force-transmitting element acts on the air-guiding element at the first engagement point, and/or the second engagement element has a flexible second force-transmitting element which acts under tension, in particular a second cable pull, wherein the second force-transmitting element acts on the air-guiding element at the second engagement point. The first force-transmitting element here acts on the air-guiding element additionally at a third engagement point, wherein the third engagement point in particular also lies on the second pivot axis. Accordingly, the second force-transmitting element acts on the air-guiding element additionally at a fourth engagement point, wherein the fourth engagement point in particular also lies on the first pivot axis. The cable pulls may each comprise a roller driven in rotation by the respective drive, and a cable running around the respective roller. The ends of the first cable may be connected to the air-guiding element at the first and third engagement points, and the ends of the second cable at the second and fourth engagement points. Instead of the cables, wires could also be provided. Also, shape-memory alloys or electric muscles or other length-changing materials may be provided as force-transmitting elements. According to this embodiment, the air-guiding element may also be actuated by flexible engagement elements which act under tension. With the further engagement points, despite the engagement elements acting only under tension, a forward and back movement of the air-guiding element can still be achieved and hence pivoting in pivot directions about both pivot axes.

According to one embodiment, the first engagement point is arranged on an air-guiding rib of the air-guiding element, and/or the second engagement point is arranged on an air-guiding rib of the air-guiding element. In the case of a round air-guiding element, the first engagement point may in particular be arranged on an outer ring of the air-guiding element, and/or the second engagement point may be arranged on an outer ring of the air-guiding element. As stated initially, the air-guiding element may have air-guiding ribs which extend in particular in the longitudinal direction of the air-guiding element and are spaced apart from each other by passage openings. On pivoting of the air-guiding element about one or both pivot axes, the air-guiding ribs and the passage openings are pivoted accordingly and thus guide the air stream from the main flow direction into the corresponding direction. In the case of a cylindrical air-guiding element, in particular radial ribs extending radially outward from the longitudinal axis, and/or circumferential ribs extending with constant radial position circumferentially around the longitudinal axis may be provided. Naturally other structures are also conceivable. The first drive element and/or the second drive element may act on one of these air-guiding ribs. According to such an embodiment, the first engagement point is arranged on an air-guiding rib which extends only over part of the length of the air-guiding element, and/or the second engagement point is arranged on an air-guiding rib which extends only over part of the length of the air-guiding element. As stated, the air-guiding ribs may extend along the longitudinal axis of the air-guiding element. According to this embodiment, at least the air-guiding rib having the engagement point does not extend over the entire length of the air-guiding element along the longitudinal axis, but only over portions. In particular, in the case of an engagement element protruding into the air channel and acting on the air-guiding element from a back side facing the air channel, the air-guiding rib having the engagement point may be mounted on the longitudinal axis in a forward position relative to an outer wall of the air-guiding element. Also, the first engagement point may be arranged on an extension of an air-guiding rib directed upstream, and/or the second engagement point may be arranged on an extension of an air-guiding rib directed upstream. With these embodiments, in particular when coupling rods are provided as engagement elements, a greater freedom of movement of the air-guiding element relative to the engagement element may be achieved, since the coupling rods do not impact on the air-guiding ribs even on extreme deflections of the air-guiding element.

According to one embodiment, the first engagement element has a first rotating element which acts on the air-guiding element at the first engagement point on an outer circumference of the air-guiding element, and/or the second engagement element has a second rotating element which engages on the air-guiding element at the second engagement point on an outer circumference of the air-guiding element. In particular, the first engagement element may have a first rotating element which acts on the air-guiding element at the first engagement point on an outer circumference of the air-guiding element, wherein rotation of the first rotating element via the first drive pivots the air-guiding element about the first pivot axis, and/or the second engagement element may have a second rotating element which acts on the air-guiding element at the second engagement point on an outer circumference of the air-guiding element, wherein a rotation of the second rotating element via the second drive pivots the air-guiding element about the second pivot axis. In this embodiment, the definition of the pivot axes according to the invention, and hence the adjustability in the manner of an actuator, are achieved by engagement of the engagement elements on an outer circumference of the air-guiding element. According to such an embodiment, the first rotating element is a first toothed wheel which interacts with a first toothing arranged on the outer circumference of the air-guiding element, and/or the second rotating element is a second toothed wheel which interacts with a second toothing arranged on the outer circumference of the air-guiding element. The rotating elements may accordingly be toothed wheels which in particular may be provided with teeth only over part of their circumference. Thus also, actuation of the air-guiding element in the manner of an actuator may also be achieved with a toothed wheel mechanism. The toothing in the outer circumference of the air-guiding element may in particular be configured such that, on pivoting of the air-guiding element about the first pivot axis, the teeth of the second toothed wheel run in its second toothing, or on pivoting of the air-guiding wheel about the second pivot axis, the teeth of the first toothed wheel run in its first toothing. According to an alternative embodiment, the first rotating element is a first wheel which runs on the outer circumference of the air-guiding element, and/or the second rotating element is a second wheel which runs on the outer circumference of the air-guiding element.

BRIEF DESCRIPTION OF THE DRAWINGS

Exemplary embodiments of the invention are explained below with reference to figures. The drawings show.

Figure 2:
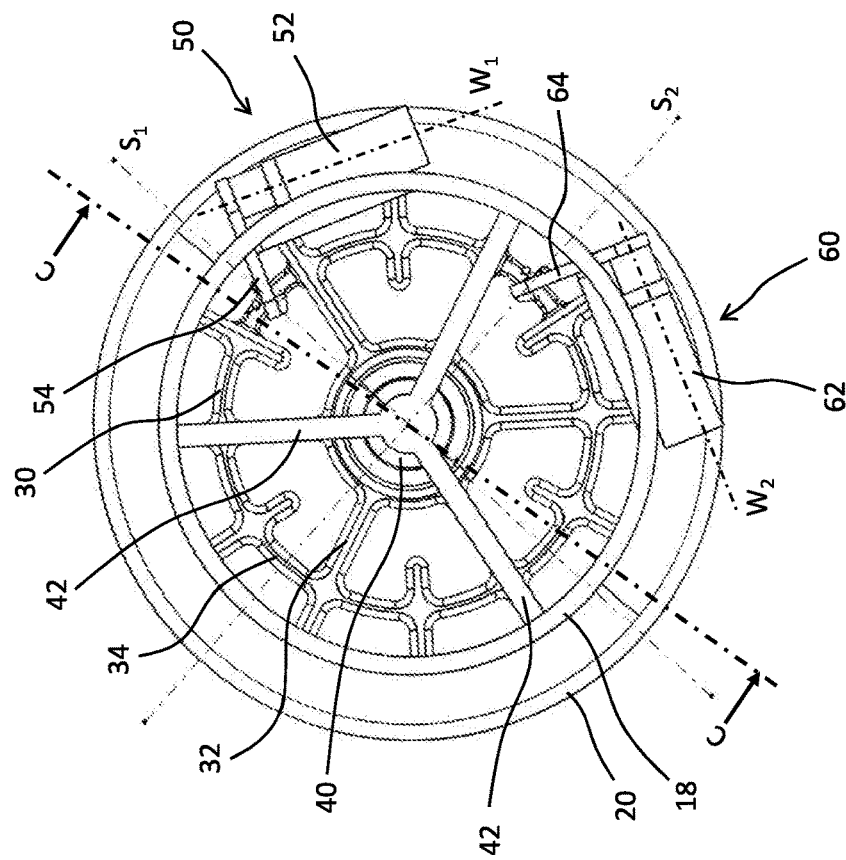
Figure 1:
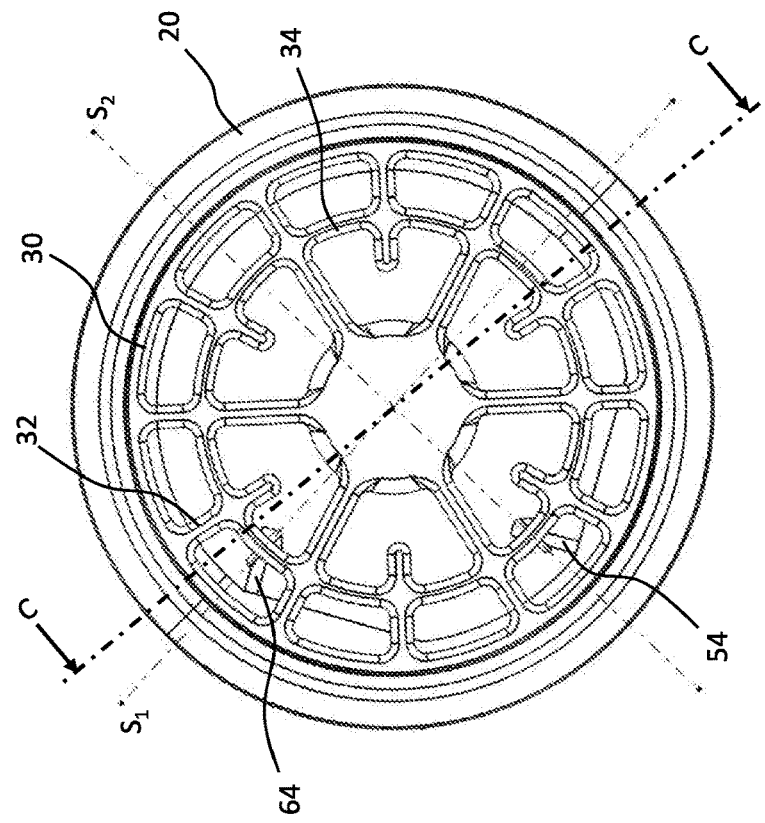
FIG. 1 a front view of an air vent according to the invention in a first embodiment, FIG. 2 a rear view of the air vent from FIG. 1, FIG. 3 a side view of the air vent from FIG. 1, FIG. 4 a sectional view through the air vent along the cut line marked C-C in FIGS. 1 and 2, FIGS. 5-7 the sectional views corresponding to FIG. 4 through the air vent with the air-guiding element in different positions, FIG. 8 a sectional view of an air vent according to the invention in a second embodiment, FIGS. 9-10 a sectional view of an air vent according to the invention in a third embodiment, FIG. 11 a sectional view of an air vent according to the invention in a fourth embodiment, FIG. 12 a sectional view of an air vent according to the invention in a fifth embodiment, FIG. 13 an air vent according to the invention in a sixth embodiment, FIGS. 14-15 a sectional view of an air vent according to the invention in a seventh embodiment, FIG. 16 a sectional view of an air vent according to the invention in an eighth embodiment, and FIGS. 17-19 an air vent according to the invention in a ninth embodiment.
Figure 3:
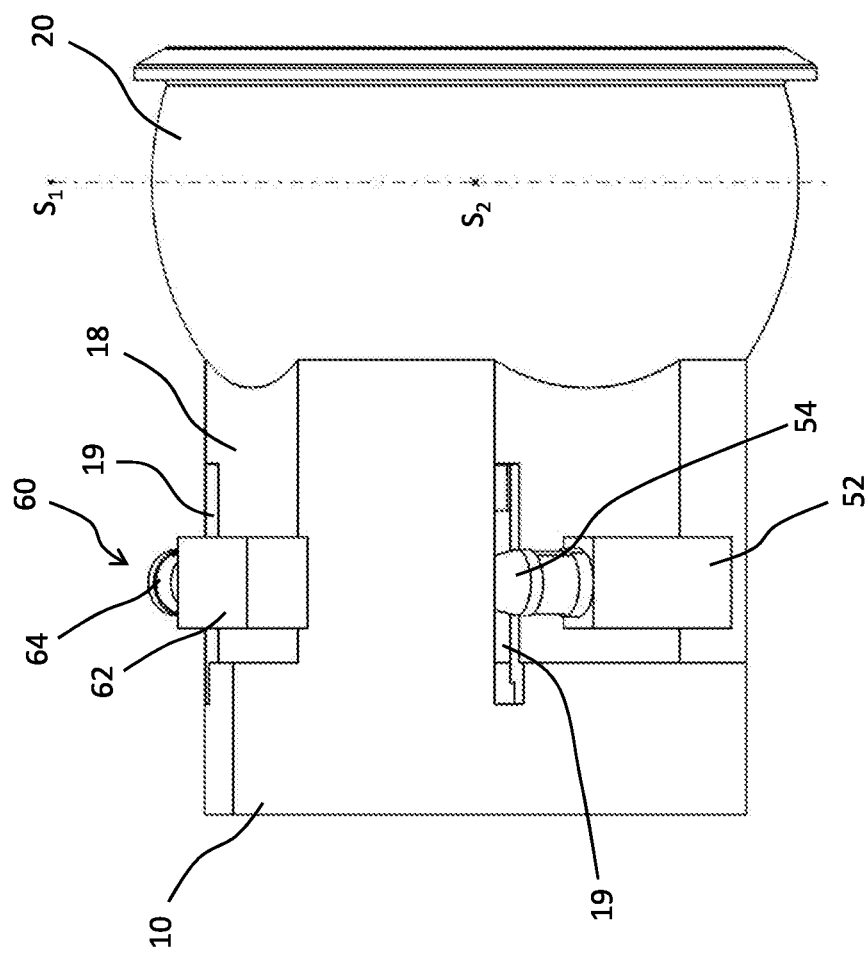

Unless indicated otherwise below, the same reference signs designate the same objects below.

DETAILED DESCRIPTION

The air vent shown in FIGS. 1 to 7 comprises a housing 10 with an inlet opening 12 and an outlet opening 16, and delimits an air channel 14 for air flowing from the inlet opening 12 to the outlet opening 16. The housing 10 has a substantially cylindrical housing portion 18 and a spherical housing portion 20 adjoining the cylindrical portion 18 downstream in the main flow direction H. In the main flow direction H, the air channel 14 widens at the transition from the cylindrical housing portion 18 to the spherical housing portion 20, and then narrows again towards the outlet opening 16. A cylindrical air-guiding element 30 is mounted in the spherical portion 20 of the housing 10. The air-guiding element 30 extends along a longitudinal axis L lying on the cylinder axis, and has air-guiding ribs 32, 34 also extending along the longitudinal axis L. The air-guiding ribs are divided into radial ribs 32, which run at least in portions along the cylinder radius radially to the longitudinal axis L, and circumferential ribs 34, which run around the longitudinal axis L at least in portions with a constant radial position. The casing surface 36 of the air-guiding element 30 is curved radially towards the outside, wherein the curvature of the casing surface 36 corresponds to the curvature of an inner face 22 of the spherical housing portion 20. The air-guiding element 30 thus forms a disc-like ball segment.

The air-guiding element 30 is mounted inside the spherical portion 20 of the housing 10 so as to be pivotable arbitrarily about a center of rotation D. For this, the air-guiding element 30 is mounted on the housing via a ball joint sitting on the center of rotation D, wherein the ball joint comprises a mounting receptacle 38 which is arranged centrally in the air-guiding element 30 on the longitudinal axis L, and a mounting ball 40 which is connected to the housing 10. The mounting ball 40 sits with its center on the center of rotation D and is connected to the cylindrical portion 18 of the housing 10 via a connecting portion 42. Via the ball joint formed in this way, the air-guiding element 30 can be pivoted in different directions about the center of rotation D. The air-guiding element 30 is here tilted about pivot axes $S_1$ and $S_2$, as will be explained below. The casing surface 36 here slides along the inner face 22 of the spherical housing portion 20. The air-guiding element 20 thus serves to deflect the air stream flowing in the main flow direction H through the air channel 14 into any directions standing perpendicularly to the main flow direction H. This means that the air-guiding element 30 can give the air stream a direction component in any directions perpendicularly to the main flow direction H. When the air vent is installed in the vehicle, the air-guiding element may thus orient the air stream emerging from the outlet opening, for example upward or downward or to the sides or in any intermediate directions. The air stream here flows through passage openings 35 which are formed by the air-guiding ribs 32, 34 of the air-guiding element 30. The downstream ends of the passage openings 35 then form the air outlet, i.e. in particular together with the housing 10, they may form the outlet opening 16. Such air-guiding elements, which serve to deflect the air in any direction and not only on one axis, have always had to be adjusted manually in previously known air vents. The air vent according to the invention however allows adjustability in the manner of an actuator, in particular electrically, as will be explained below.

The air vent according to the invention comprises a first drive element 50 and a second drive element 60. The first drive element 50 acts on the air-guiding element 30 at a first engagement point $A_1$ which is arranged in a circumferential rib 34 of the air-guiding element 30, while the second drive element 60 acts on the air-guiding element 30 at a second engagement point which is different from the first engagement point and is also arranged in a circumferential rib 34 of the air-guiding element 30. Here, the second engagement point $A_2$ together with the center of rotation D of the air-guiding element 30 defines a first pivot axis $S_1$ about which the first drive element 50 may pivot the air-guiding element 30. The first engagement point $A_1$ together with the center of rotation D of the air-guiding element 30 forms a second pivot axis $S_2$ about which the second drive element 60 may pivot the air-guiding element 30. The first drive element 50 comprises as an electric drive an electric motor 52, a lever arm 54 mounted on a shaft of the electric motor 52 so as to be pivotable about a shaft axis $W_1$, and a coupling rod 56 which is connected by a first end to the lever arm 54 and by a second end to the air-guiding element 30 at the engagement point $A_1$. The second drive element 60 is constructed accordingly and has as an electric drive an electric motor 62, a lever arm 64 connected to a shaft of the electric motor 62 and pivotable about a shaft axis $W_2$ of the shaft, and a coupling rod 66 which is connected by a first end to the lever arm 66 and by a second end to the air-guiding element 30 at the engagement point $A_2$. The engagement points $A_1$, $A_2$ are situated at the same distance from the center of rotation D but are however offset to each other by a right angle. In other words, the engagement points $A_1$, $A_2$ lie at the same radial position on the longitudinal axis L and between them enclose an angle of 90°. The pivot axes $S_1$, $S_2$ thus stand at a right angle to each other. Also, the pivot axes $S_1$, $S_2$ stand at a right angle to the longitudinal axis L. Thus a pivot plane spanned by the pivot axes $S_1$, $S_2$ also stands perpendicularly on the longitudinal axis L. The electric motors 52, 62 are each mounted outside the air channel 14 on an outside of the cylindrical housing portion 18, wherein the lever arms 54, 64 protrude into the air channel 14 via passage openings 19 provided in the cylindrical housing portion 18. The coupling rods 56, 66 engage in the manner of hooks in passage openings provided in the circumferential rib 34 at the engagement points $A_1$, $A_2$. The electric motors 52, 62 are arranged on the outside of the cylindrical housing portion 18, offset to each other by 90°, corresponding to the offset of the engagement points $A_1$, $A_2$.

Figure 4:
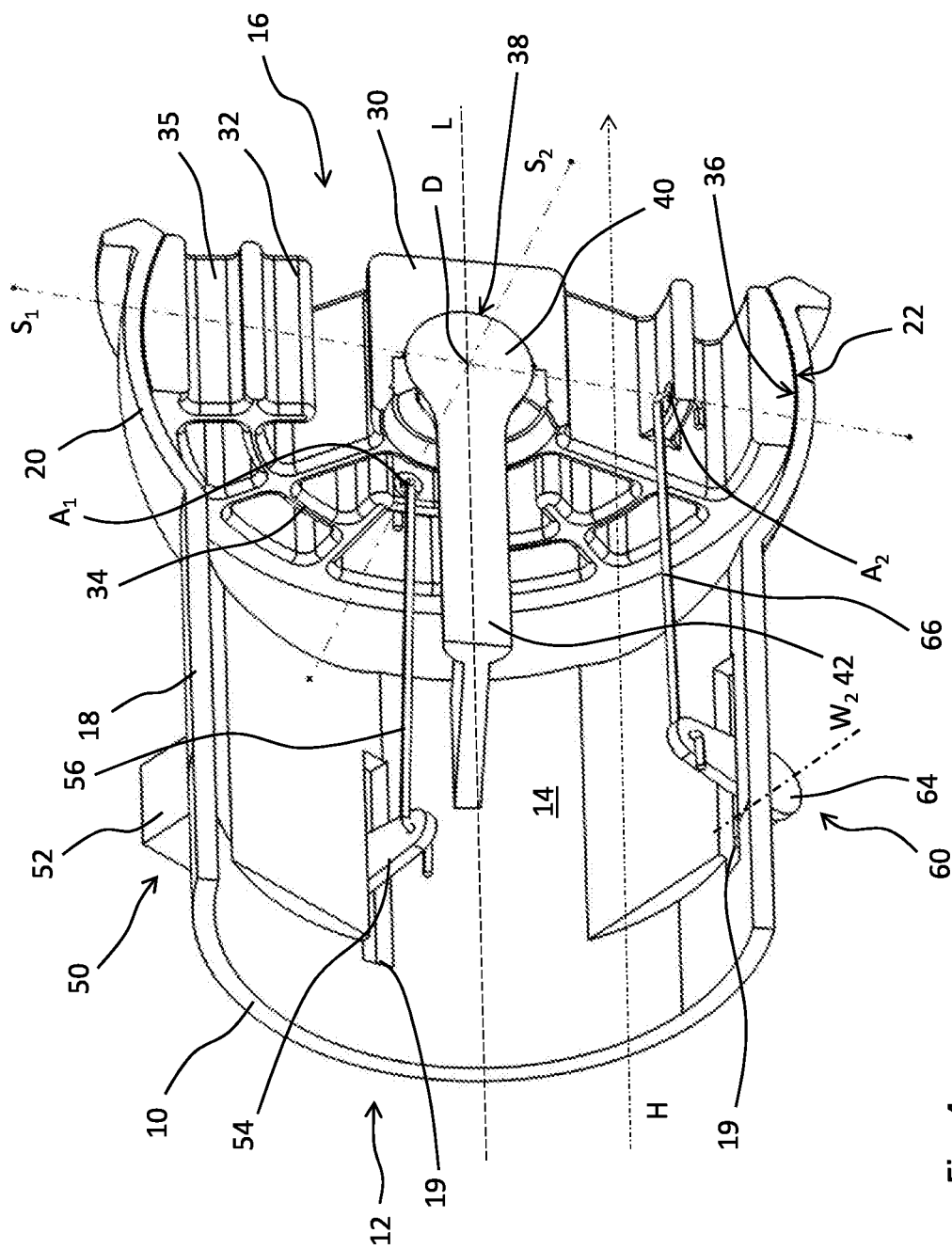

This connection of the drive elements 50, 60 to the air-guiding element 30 according to the invention allows an electric adjustability of the air-guiding element 30 to be guaranteed in any directions about the center of rotation, as will be explained below with reference to FIGS. 5 to 7. FIG. 4 firstly shows the air-guiding element 30 in a neutral position, in which the longitudinal axis L of the air-guiding element 30 runs parallel to the main flow direction H. An air stream flowing through the air channel 14 in the main flow direction H is accordingly not deflected from the main flow direction by the air-guiding element 30, since the air-guiding ribs 32, 34 or passage openings 35 also run along the longitudinal axis L in this position.

Figure 5:
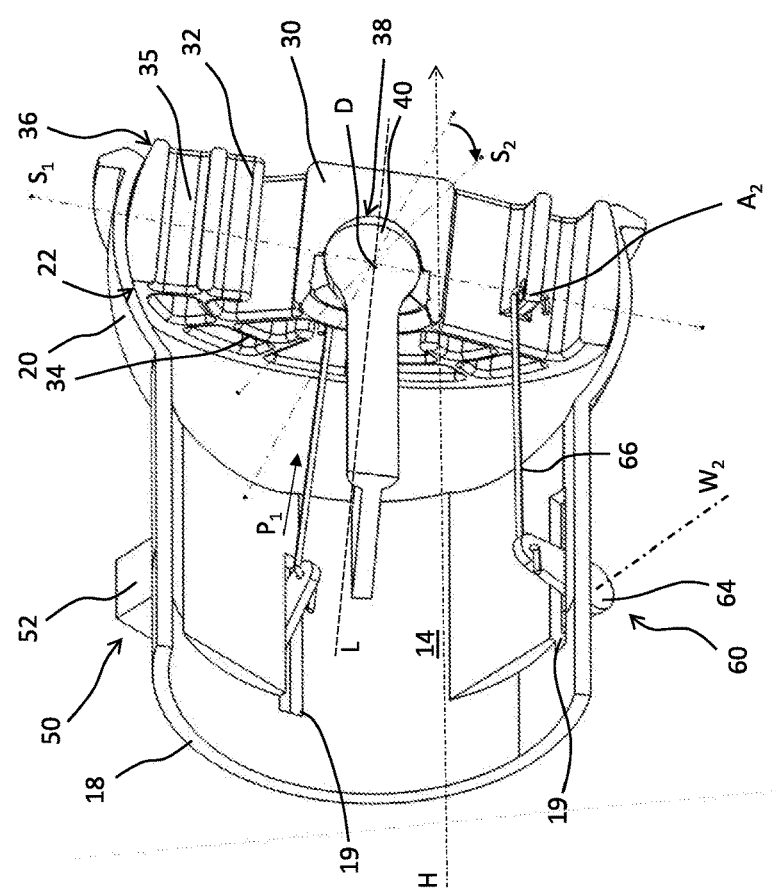

In FIG. 5, the air-guiding element 30 has been pivoted about the first pivot axis $S_1$ by the first drive element 50. For this, the lever arm 54 is pivoted to the right in FIG. 5 via the electric motor 52, so that the coupling rod 56 is pushed to the right in arrow direction $P_1$. A side of the air-guiding element 30 carrying the engagement point $A_1$ here extends at least partially out of the spherical housing portion 20; this side of the air-guiding element is thus moved downstream. The opposite side of the air-guiding element is however moved into the air channel, i.e. upstream. This is evident in particular since the pivot axis $S_2$ is tilted about the center of rotation D due to the shifting of the engagement point $A_1$, as shown in FIG. 5. Here no rotation takes place about the pivot axis $S_2$. An air-guiding element adjusted in this way can now cause a deflection of the air stream from the main flow direction along the tilted pivot axis $S_2$ towards the left when viewed onto the front of the air vent.

Figure 6:
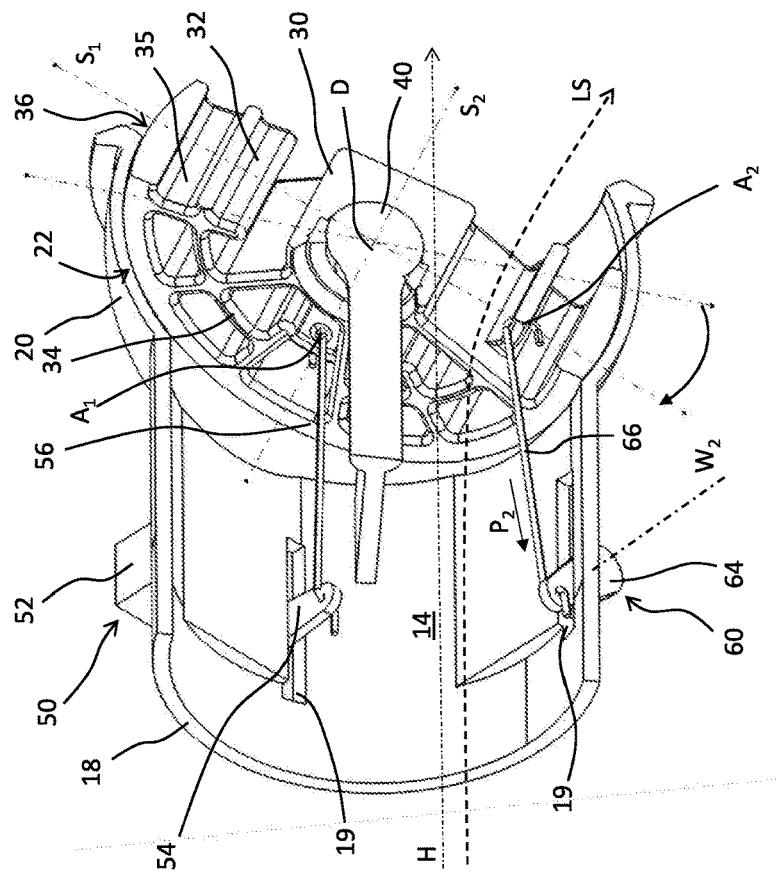

In FIG. 6, starting from the neutral position shown in FIG. 4, the air-guiding element 30 is pivoted about the second pivot axis $S_2$ via the second drive element 60. For this, the electric motor 62 has rotated the lever arm 64 about the shaft axis $W_2$ such that the coupling rod 66 has been pulled upstream in arrow direction $P_2$. As a result, the first pivot axis $S_1$ is tilted about the second pivot axis $S_2$, as shown in FIG. 6. Thus now the air stream may be deflected from the main flow direction downward when viewed onto the front of the air vent, as indicated by the dotted line LS. Naturally, the coupling rod 66 may also be moved downstream against arrow direction $P_2$. Also, the coupling rod 56 may be moved upstream against arrow direction $P_1$, causing a deflection of the air flow to the sides and upward and downward.

Figure 7:
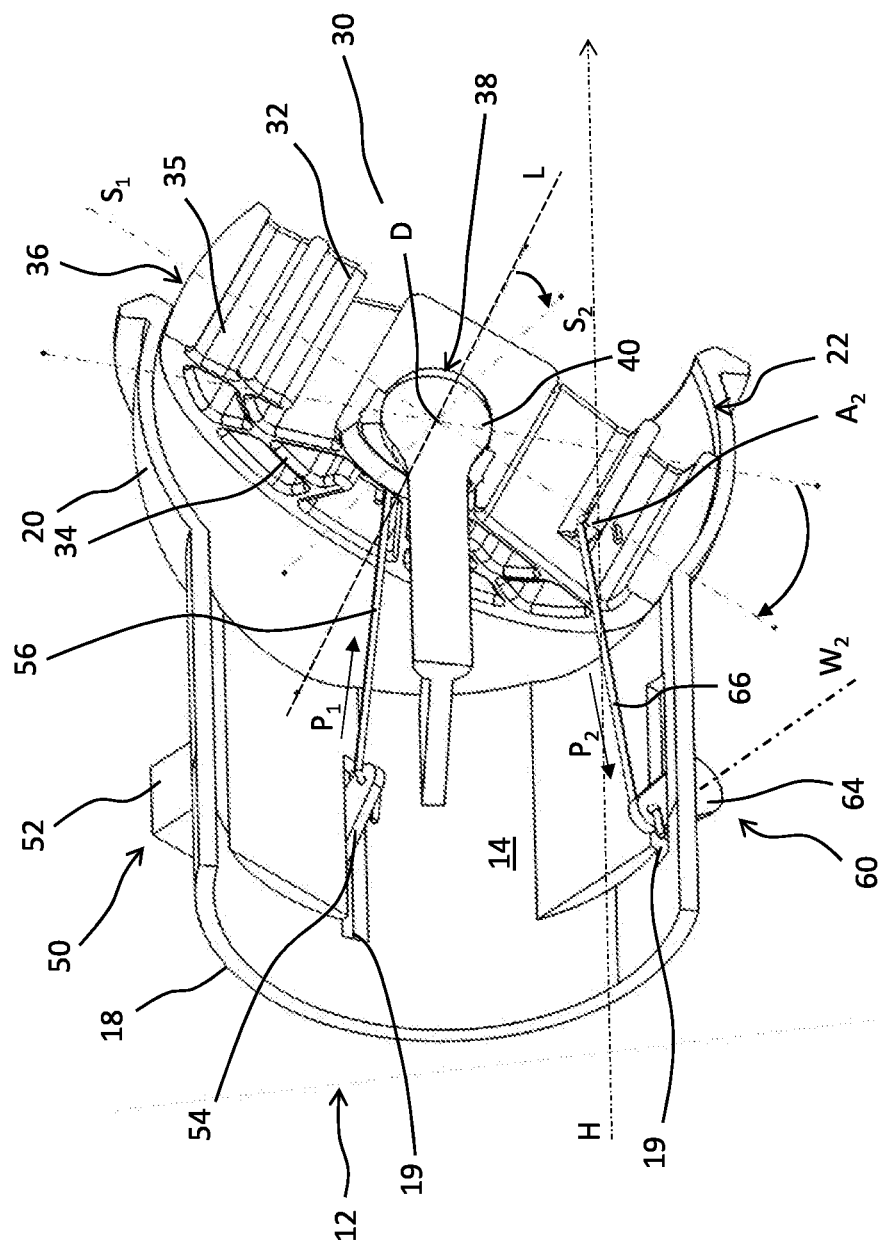

FIG. 7 shows the air vent with the air-guiding element 30 pivoted about both pivot axes $S_1$, $S_2$. Here, both the first coupling rod 56 is moved in arrow direction $P_1$ as explained above, and the second coupling rod 66 is moved in arrow direction $P_2$. This leads to tilting of both the first pivot axis $S_1$ and the second pivot axis $S_2$ about the center of rotation D. An air stream flowing through the air channel 14 is here deflected from the main flow direction H downward to the left when viewed onto the front of the air vent.

The connection of the drive elements to the air-guiding element according to the invention allows, in a simple and effective fashion, an adjustability of the air-guiding element in the manner of an actuator, in particular electrically.

Figure 8:
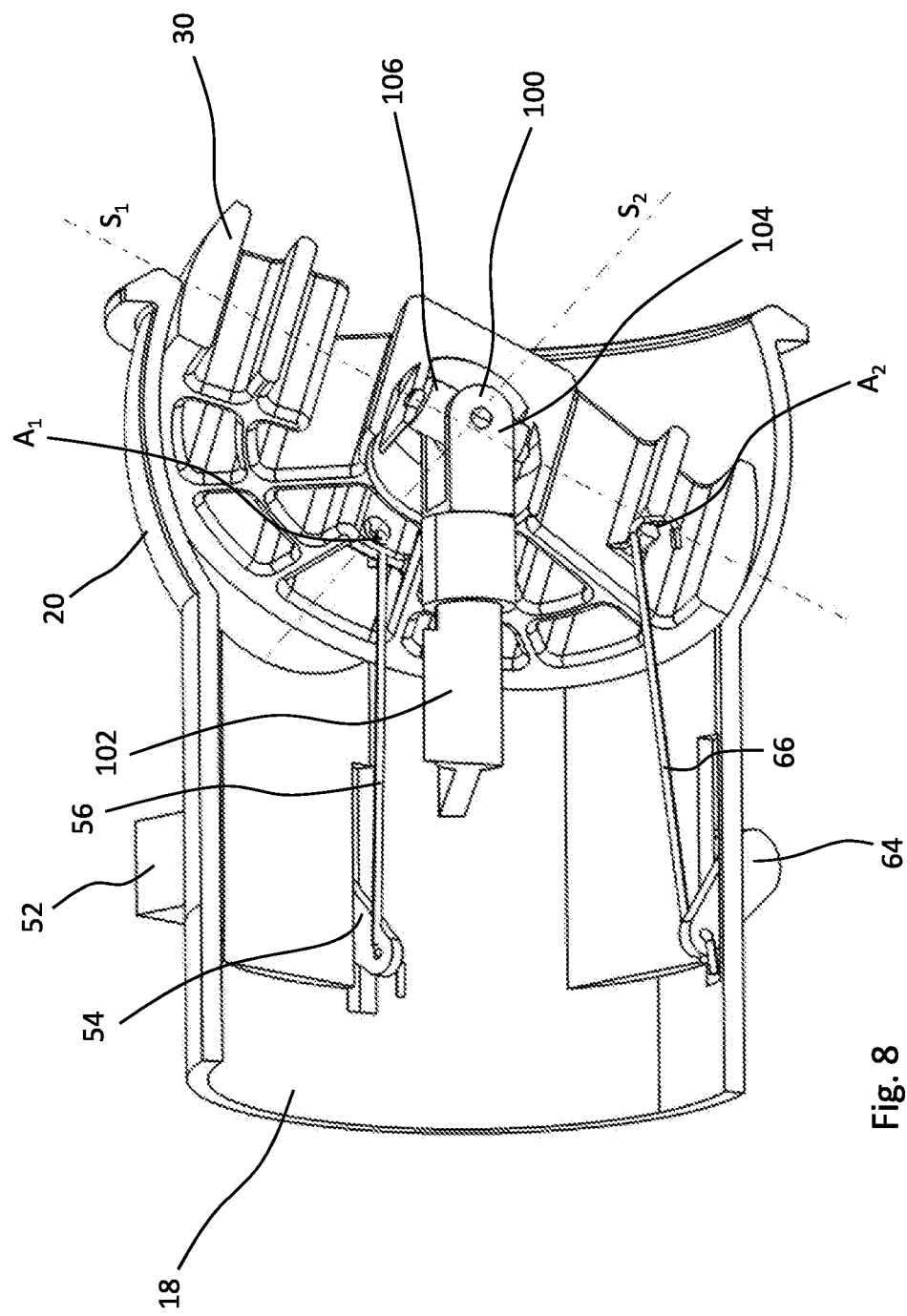

A second embodiment of an air vent according to the invention is shown in FIG. 8. This air vent differs from that presented above in that the air-guiding element 30 is mounted on the housing not via a ball joint sitting on the center of rotation D, but via a cardan joint 100 sitting on the center of rotation D. The cardan joint 100 comprises a connecting portion 102 connected to an inner wall of the housing 10, and a universal suspension adjacent thereto, with two elements 104, 106 which can be tilted about mutually perpendicular pivot axes $S_1$, $S_2$. The air-guiding element 30 is connected to the element 106. Here again, the air-guiding element is pivoted via the drive elements 50, 60 in the manner outlined above.

Figure 9:
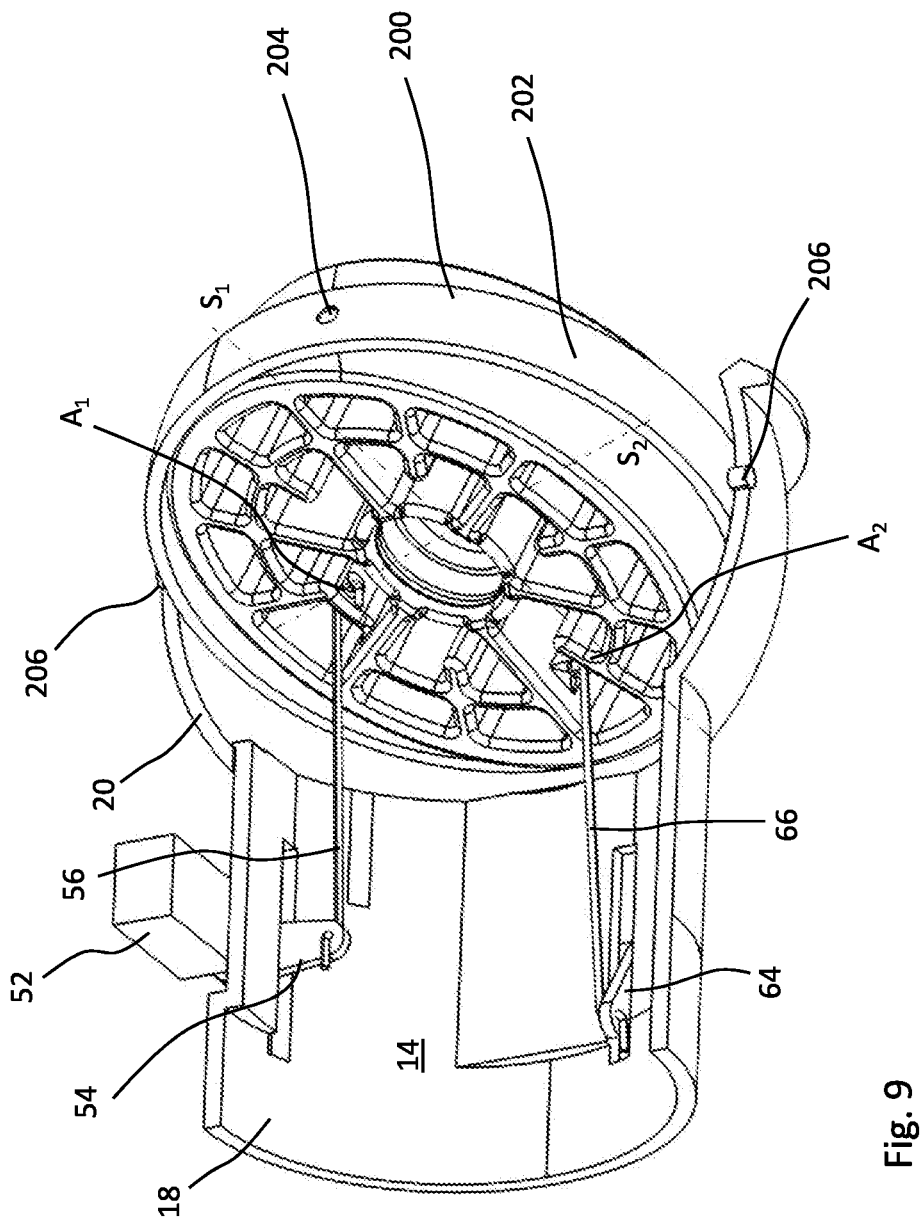
Figure 10:
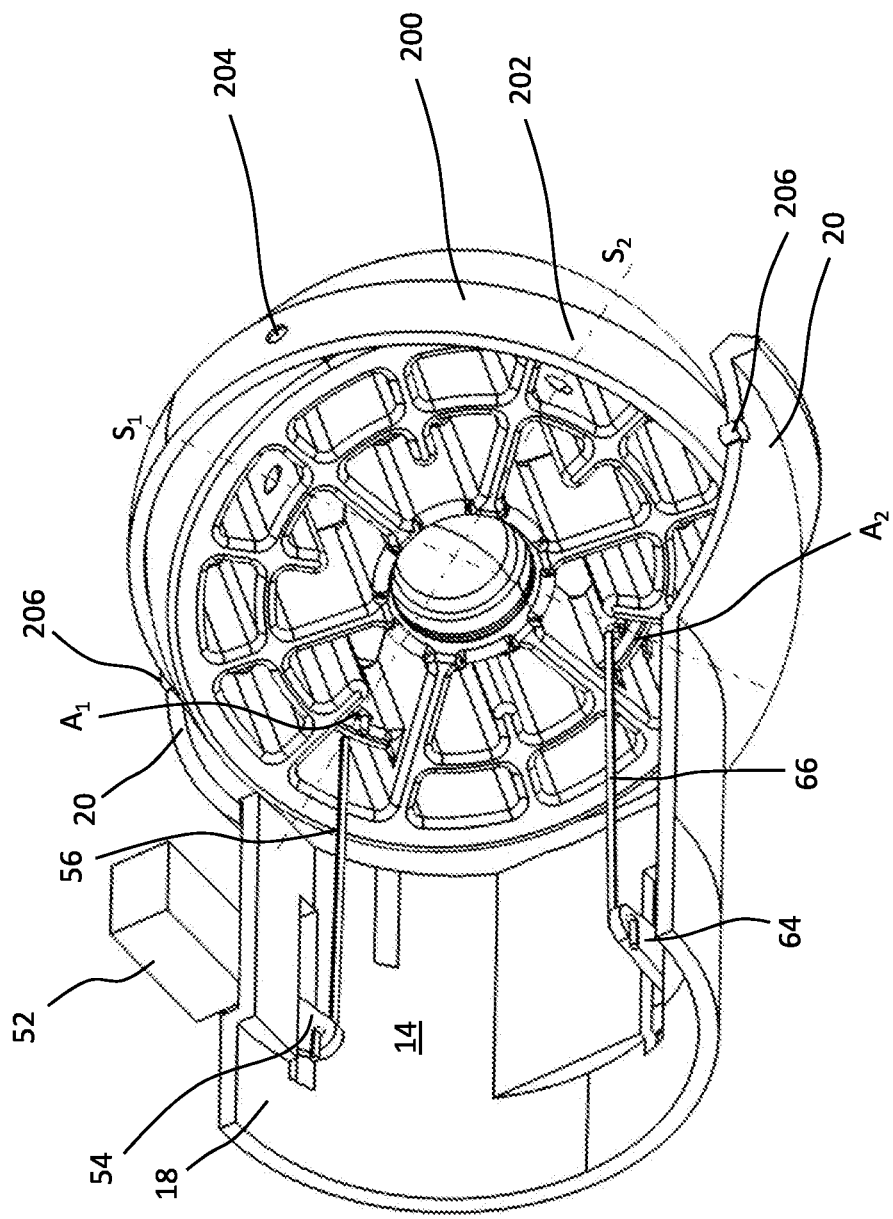

A third embodiment of an air vent according to the invention is shown in FIGS. 9 and 10. This air vent differs the first embodiment in that the air-guiding element 30 is mounted on the housing 10 not via the ball joint sitting on the center of rotation D, but via a cardan joint 200 which is arranged on an outer circumference of the air-guiding element 30 and on the inner face 22 of the spherical housing portion 20. The cardan joint 200 comprises a mounting ring 202 which surrounds the air-guiding element 30 and is connected to the casing surface 36 of the air-guiding element 30 via mutually opposing mounting pins 204 (only one of which is shown in the figures). The air-guiding element 30 is pivotable about the first pivot axis $S_1$ inside the mounting ring 202. The mounting ring 202 is mounted on the spherical housing portion 20 by means of two outwardly extending mounting pins 206 arranged on opposite sides of the mounting ring 202. FIGS. 9 and 10 show different deflections of the air-guiding element 30. Here again, the air-guiding element 30 is pivoted via the drive elements 50, 60 in the manner explained above. The cardan suspension here forms two separate additional pivot axes, which allow free pivoting of the air-guiding element about the center of rotation. The cardan system thus finally forms the center of rotation D.

Figure 11:
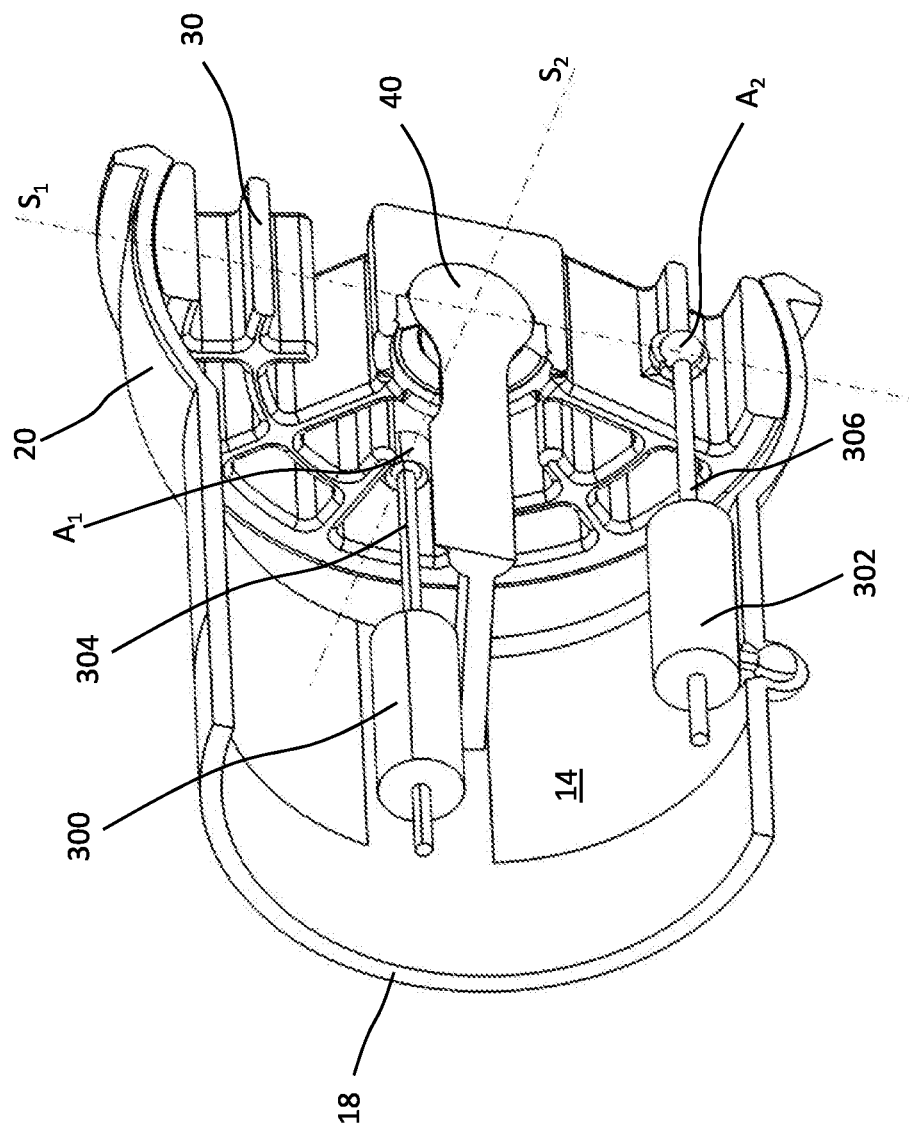

A fourth embodiment of the air vent according to the invention is shown in FIG. 11. This air vent differs from the first embodiment in that as drive elements, stroke-generating motors 300, 302, for example linear or stroke-generating spindle motors, are provided which are arranged inside the air channel 14 and act on the air-guiding element 30 via a respective coupling rod 304, 306. The first coupling rod 304 can be moved upstream and downstream via the first stroke-generating motor 300, and hence the air-guiding element 30 can be pivoted about pivot axis $S_1$. Similarly, the second coupling rod 306 can be moved upstream and downstream via the second stroke-generating motor 302, and hence the air-guiding element 30 can be pivoted about the second pivot axis $S_2$.

Figure 12:
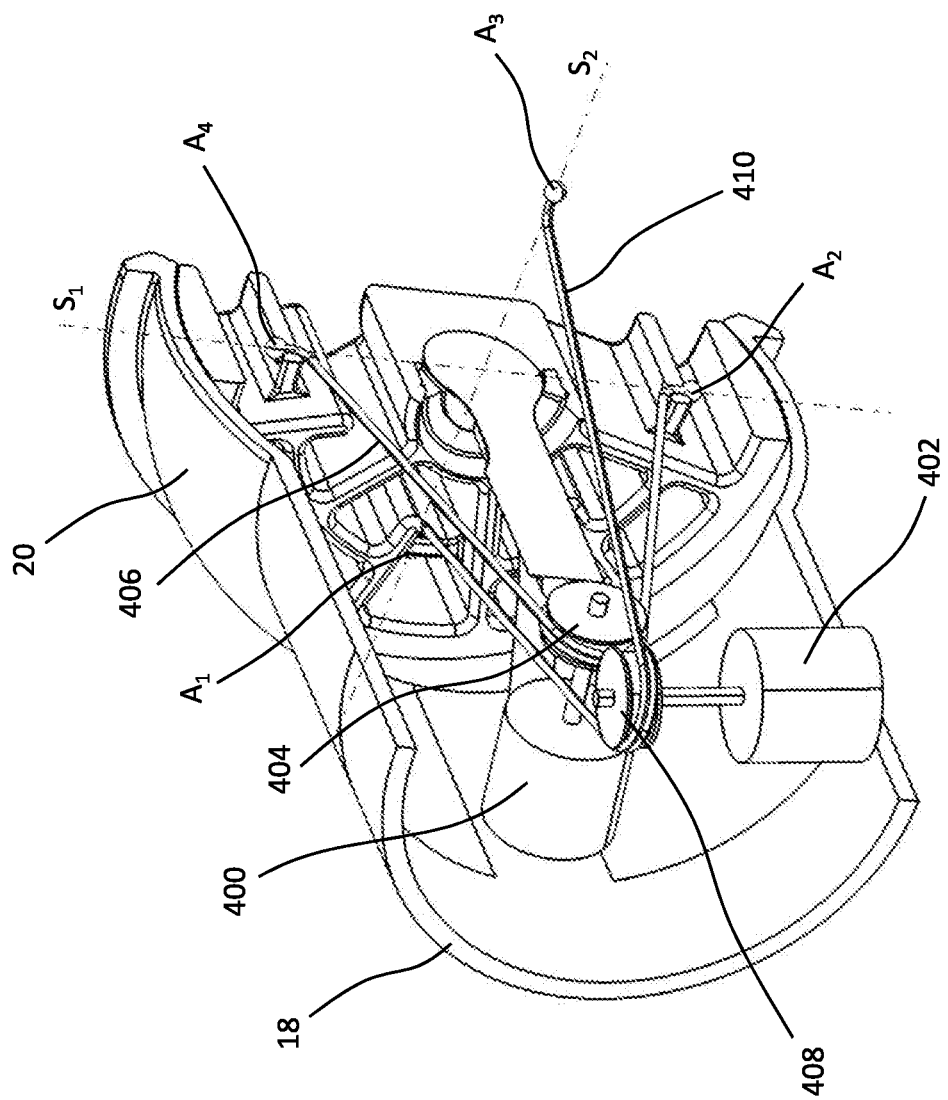

A fifth embodiment of an air vent according to the invention is shown in FIG. 12. This air vent differs from the first embodiment in that as drive elements, drives 400, 402 are provided which are arranged inside the air channel 14 and act on the air-guiding element via cable pulls. A first cable pull comprises a first roller 404 driven in rotation by the first drive 400, and a first cable 406 running around the first roller 404. A second cable pull comprises a second roller 408 driven in rotation by the second drive 402, and a second cable 410 running around the second roller 408. The ends of the first cable 406 are connected to the air-guiding element 30 at the second engagement point $A_2$ and at a fourth engagement point $A_4$, while the ends of the second cable 410 are connected to the air-guiding element 30 at the first engagement point $A_1$ and at a third engagement point $A_3$. The rollers 404, 408 may be rotated about their respective rotation axes via the drives 400, 402, and hence a tension applied to the air-guiding element 30 via the cables 406, 410. The further engagement points allow a forward and back movement of the air-guiding element to be achieved despite the engagement elements acting only under tension, and hence allow pivoting in pivot directions about both pivot axes. In this case, the pivot axes are formed by the center of rotation and the respective two opposing engagement points of a cable (acting only under tension).

Figure 13:
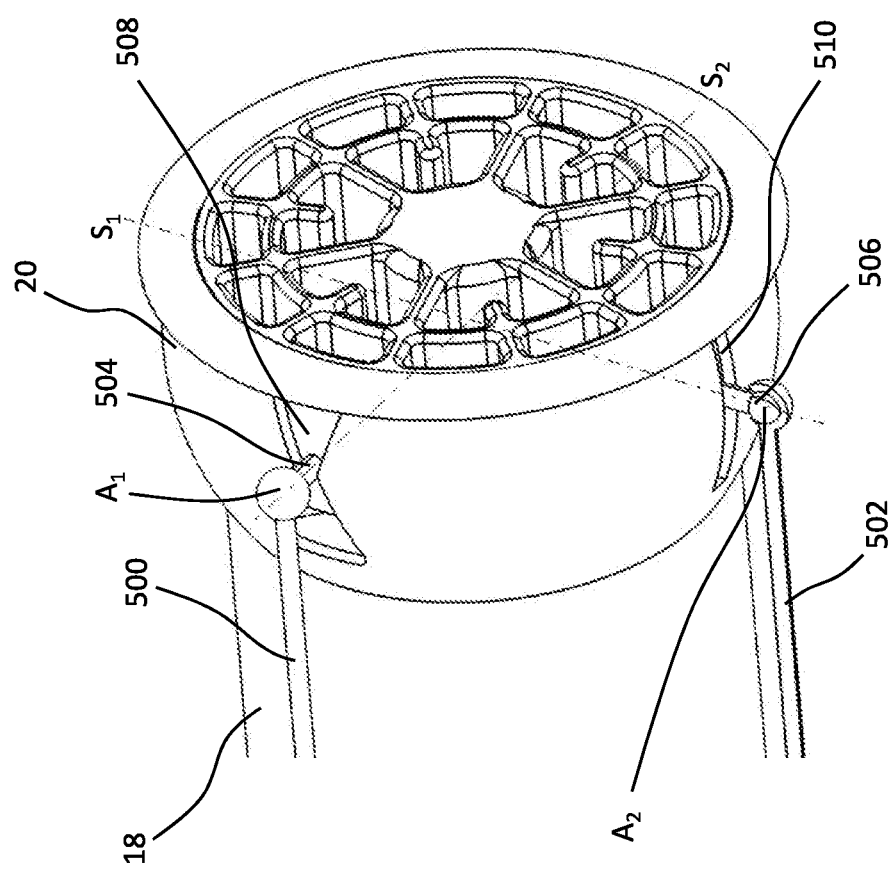

A sixth embodiment of the air vent according to the invention is shown in FIG. 13. This air vent differs from the first embodiment in that as engagement elements, pushrods 500, 502 are provided which are arranged outside the air channel 14 and can be moved via drives (not shown), for example the stroke-generating motors mentioned above. A first pushrod 500 cooperates with a first peg 504 extending from the casing surface 36 of the air-guiding element 30, and a second pushrod 502 cooperates with a second peg 506 extending from the casing surface 36 of the air-guiding element 30. The pegs 504, 506 each protrude through an opening 508, 510 in the spherical housing portion 20. The respective engagement points $A_1$ and $A_2$ lie at the mounting points between the pegs and the pushrods. The opening 508 through which the first peg 504 extends is formed in the manner of an hourglass, in order to allow pivoting of the air-guiding element 30 about the first pivot axis $S_1$ even when the air-guiding element 30 has already pivoted about the second pivot axis $S_2$.

Figure 15:
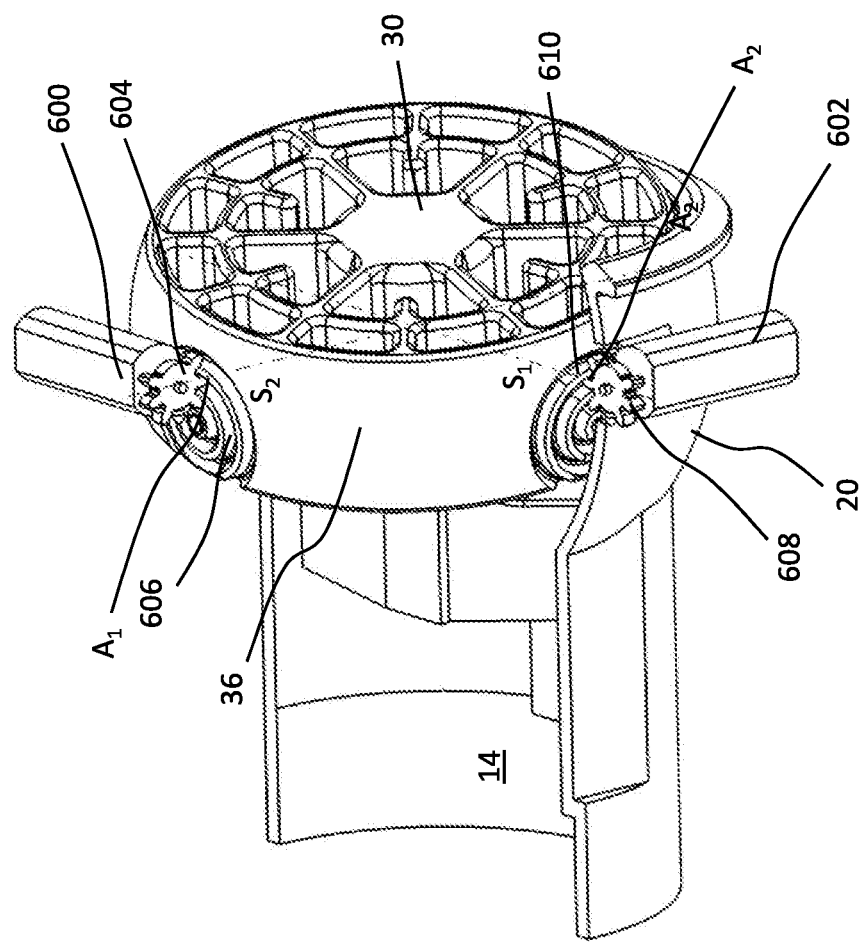
Figure 14:
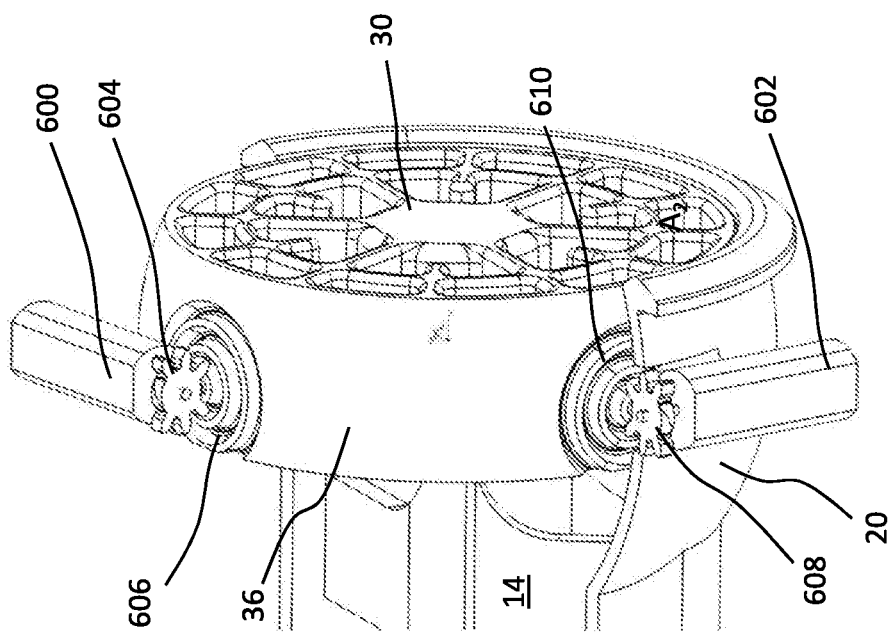

A seventh embodiment of an air vent according to the invention is shown in FIGS. 14 and 15. This air vent differs from the first embodiment in that as drive elements, drives 600, 602 are arranged outside the air channel 14 and act on the air-guiding element 30 by means of a toothed wheel mechanism. For this, as a rotating element, a first toothed wheel 604 connected to the first drive 600 cooperates with a first toothing 606 arranged on the outer circumference of the casing surface 36 of the air-guiding element 30. A second toothed wheel 608, as a rotating element and connected to the second drive 602, cooperates with a second toothing 610 arranged on the outer circumference of the casing surface 36 of the air-guiding element 30. Here the toothed wheels 604, 608 extend through the housing 10 on the spherical housing portion 20. A rotation of the toothed wheel 604 about its rotation axis, caused by the drive 600, pivots the air-guiding element 30 about its first pivot axis $S_1$, and a rotation of the toothed wheel 608 about its rotation axis, caused by the drive 602, pivots the air-guiding element 30 about its second pivot axis $S_2$, as shown in FIG. 15. On movement of the first toothed wheel 604, the teeth of the second toothed wheel 608 run along the second toothing 610 which is formed as a ring for this purpose. Also, the teeth of the first toothed wheel 604 run along the circular first toothing 606 when the second toothed wheel 608 is moved. In this way, the pivot axes evident in the figures are defined, wherein the engagement points $A_1$ and $A_2$ each lie at the contact point of the toothed wheels with the toothing of the air-guiding element.

An eighth embodiment of an air vent according to the invention is shown in FIG. 16. This air vent differs from the first embodiment in that as engagement elements, wheels 704, 706 running on the casing surface 36 of the air-guiding element 30 are provided as rotating elements. Via drives 700, 702, the wheels 704, 706 are rotated about their rotation axes in the same way as the toothed wheels presented above, and hence the air-guiding element 30 is pivoted about the respective pivot axis $S_1$, $S_2$. The engagement points $A_1$ and $A_2$ lie at the respective contact points of the wheels 704, 76 with the casing surface 36.

A ninth embodiment of an air vent according to the invention is shown in FIGS. 17 to 19. The actuation is here in principle identical to that shown in FIG. 16, wherein here the wheels 800, 802 are driven via drives 808, 810. In addition to the wheels 800, 802, opposite non-driven wheels 804, 806 are provided. In this way, the air-guiding element is in particular held stable against any tilting. The individual figures illustrate different deflections of the air-guiding element 30. The housing is not shown. The engagement points are here formed by the points at which the wheels touch the casing surface 36. Also the axes of the wheels are offset to each other, which prevents a shift of the air-guiding element in the longitudinal direction. Because the four wheels hold the air-guiding element on a casing surface from four sides with offset axes, no separate center of rotation is required, since the center of rotation is formed by the guidance of the casing surface between the wheels.

LIST OF REFERENCE SIGNS

10 Housing
12 Inlet opening
14 Air channel
16 Outlet opening
18 Cylindrical housing portion
19 Passage opening
20 Spherical housing portion
22 Inner face
30 Air-guiding element
32 Radial rib
34 Circumferential rib
35 Passage opening
36 Casing surface
38 Mounting receptacle
40 Mounting ball
42 Connecting portion
50 First drive element
52 Electric motor
54 Lever arm
56 Coupling rod
60 Second drive element
62 Electric motor
64 Lever arm
66 Coupling rod
100 Cardan joint
102 Connecting portion
104, 106 Elements of cardan joint
200 Cardan joint
202 Mounting ring
204 Mounting pins
206 Mounting pins
300 First stroke-generating motor
302 Second stroke-generating motor
304 First coupling rod
306 Second coupling rod
400 First drive
402 Second drive
404 First roller
406 First cable
408 Second roller
410 Second cable
500 First push-rod
502 Second push-rod
504 First peg
506 Second peg
508 First opening
510 Second opening
600 First drive
602 Second drive
604 First toothed wheel
606 First toothing
608 Second toothed wheel
610 Second toothing
700 First drive
702 Second drive
704 First wheel
706 Second wheel
800 First wheel
802 Second wheel
804, 806 Wheels
808 First drive
810 Second drive
H Main flow direction longitudinal axis
LS Air stream
D Center of rotation
$S_1$, $S_2$ Pivot axes
$A_1$, $A_2$ Engagement points
$W_1$, $W_2$ Shaft axes
$P_1$, $P_2$ Arrow directions

The invention claimed is:

1. An air vent for a vehicle, comprising a housing (10) and an air-guiding element (30), wherein the air-guiding element (30) is mounted in the housing (10) so as to be pivotable in different directions about at least one centre of rotation (D), characterized by a first drive element, which acts on the air-guiding element (30) at a first engagement point ($A_1$), and by a second drive element, which acts on the air-guiding element (30) at a second engagement point ($A_2$), wherein the second engagement point ($A_2$) defines, with the centre of rotation (D) of the air-guiding element (30), a first pivot axis ($S_1$) about which the first drive element pivots the air-guiding element (30), and wherein the first engagement point ($A_1$) defines, with the centre of rotation (D) of the air-guiding element (30), a second pivot axis ($S_2$) about which the second drive element pivots the air-guiding element (30).

2. The air vent as claimed in claim 1, wherein a ball joint-like mounting is formed at the first engagement point ($A_1$) and/or in that a ball joint-like mounting is formed at the second engagement point ($A_2$).

3. The air vent as claimed in claim 1, wherein the air-guiding element (30) is rotatable about a longitudinal axis (L), running through the centre of rotation (D), of the air-guiding element (30).

4. The air vent as claimed in claim 1, wherein a rotation of the air-guiding element (30) about a longitudinal axis (L), running through the centre of rotation (D), of the air-guiding element (30) is blocked.

5. The air vent as claimed in claim 1, wherein the air-guiding element (30) is mounted on the housing (10) by means of a ball joint (38, 40) seated on the centre of rotation (D).

6. The air vent as claimed in claim 1, wherein the air-guiding element (30) is mounted on the housing (10) by means of a cardan joint (100) seated on the centre of rotation (D).

7. The air vent as claimed in claim 1, wherein the air-guiding element (30) is mounted on the housing (10) by guide means (22, 36) arranged on an outer circumference of the air-guiding element (30) and on an inner side of the housing by a cardan joint (200).

8. The air vent as claimed in claim 1, wherein the first drive element has a first drive (52, 300, 400, 600, 700, 808) and a first engagement element (56, 304, 406, 500, 604, 704, 800) connected to the first drive (52, 300, 400, 600, 700, 808), wherein the first engagement element (56, 304, 406, 500, 604, 704, 800) acts on the air-guiding element (30) at the first engagement point (A1), and/or in that the second drive element has a second drive (62, 302, 402, 602, 702, 810) and a second engagement element (66, 306, 410, 502, 608, 706, 802) connected to the second drive (62, 302, 402, 602, 702, 810), wherein the second engagement element (66, 306, 410, 502, 608, 706, 802) acts on the air-guiding element (30) at the second engagement point ($A_2$).

9. The air vent as claimed in claim 8, wherein the first engagement element has a first coupling rod (56, 304) which acts on the air-guiding element (30) at the first engagement point (A1), and/or in that the second engagement element has a second coupling rod (66, 306) which acts on the air-guiding element (30) at the second engagement point ($A_2$).

10. The air vent as claimed in claim 8, wherein the first drive has a stroke-generating motor (300), and/or in that the second drive has a stroke-generating motor (302).

11. The air vent as claimed in claim 8, wherein the first engagement element has a first threaded rod which acts on the air-guiding element (30) at the first engagement point (A1) and which interacts with a first thread movably mounted on the air-guiding element at the first engagement point (A1), and/or in that the second engagement element has a second threaded rod which acts on the air-guiding element (30) at the second engagement point (A2) and which interacts with a second thread movably mounted on the air-guiding element at the second engagement point (A1).

12. The air vent as claimed in claim 8, wherein the first engagement element has a flexible first force-transmitting element (406) which acts under tension, wherein the first force-transmitting element acts on the air-guiding element (30) at the first engagement point (A1), and/or the second engagement element has a flexible second force-transmitting element (410) which acts under tension, wherein the second force-transmitting element acts on the air-guiding element (30) at the second engagement point (A2).

13. The air vent as claimed in claim 8, wherein the first engagement element has a first rotating element (604, 704, 800) which engages on the air-guiding element (30) at the first engagement point (A1) at an outer circumference of the air-guiding element (30), and/or in that the second engagement element has a second rotating element (608, 706, 802) which engages on the air-guiding element (30) at the second engagement point (A2) at an outer circumference of the air-guiding element (30).

14. The air vent as claimed in claim 13, wherein the first rotating element is a first toothed wheel (604) which interacts with a first toothing (606) arranged on the outer circumference of the air-guiding element (30), and/or in that the second rotating element is a second toothed wheel (608) which interacts with a second toothing (610) arranged on the outer circumference of the air-guiding element (30).

15. The air vent as claimed in claim 13, wherein the first rotating element is a first wheel (704, 800) which runs on the outer circumference of the air-guiding element (30), and/or in that the second rotating element is a second wheel (706, 802) which runs on the outer circumference of the air-guiding element (30).

* * * * *